United States Patent
Uyama

[11] Patent Number: 5,345,855
[45] Date of Patent: Sep. 13, 1994

[54] REACTION DISC FOR A BRAKE BOOSTER
[75] Inventor: Shintaro Uyama, Saitama, Japan
[73] Assignee: Jidosha Kiki Co., Ltd., Shibuya, Japan
[21] Appl. No.: 80,752
[22] Filed: Jun. 22, 1993
[30] Foreign Application Priority Data
  Jul. 17, 1992 [JP] Japan .................................. 4-213646
[51] Int. Cl.$^5$ .............................................. F15B 9/10
[52] U.S. Cl. ........................................ 91/369.2; 92/84
[58] Field of Search ............. 60/554; 91/369.2, 369.3; 92/84

[56] References Cited
U.S. PATENT DOCUMENTS
  4,359,869 11/1982 Ideta ..................................... 60/554
  4,425,760 1/1984 Futura ............................... 91/369.3
  4,862,787 9/1989 Suzuki et al. .

Primary Examiner—Edward K. Look
Assistant Examiner—F. Daniel Lopez
Attorney, Agent, or Firm—Flynn, Thiel, Boutell & Tanis

[57] ABSTRACT

A reaction disc used in a brake booster, in particular, an improvement of an air vent formed in the outer periphery of the reaction disc is disclosed. The reaction disc is provided with a circumferentially discontinous bulge on its external peripheral surface, and a discontinuity in the bulge provides an air vent passage. A burr is formed on the external peripheral surface of the reaction disc as displaced from the bulge. The bulge has a height which is chosen to be greater than the height of the burr. When a reaction disc thus constructed is fitted into a recess of a push rod, the air vent passage provides a positive venting action for the air trapped in the recess. Accordingly, no deburring operation is required during the manufacture of the reaction disc.

7 Claims, 4 Drawing Sheets

REACTION DISC FOR A BRAKE BOOSTER

FIELD OF THE INVENTION

The invention relates to a reaction disc used in a brake booster, and more particularly, to an improvement of an air vent formed in the outer periphery of a reaction disc.

DESCRIPTION OF THE PRIOR ART

A brake booster is known in the art in which a reaction disc is received in a recess formed in one end of a push rod so that the front end face of the reaction disc is disposed in opposing relationship with the inner wall surface of the recess of the push rod while the rear end face of the reaction disc is disposed in opposing relationship with a valve plunger and a valve body.

With a reaction disc of such type, the external peripheral surface of the reaction disc is formed with an axially extending communication groove which serves as an air vent in order to allow the air which is confined between the reaction disc and the inner wall surface of the recess to be released externally when inserting the reaction disc into the recess of the push rod.

A set of upper and lower molds are used in a molding process which is employed to manufacture a reaction disc by vulcanization. Each of these molds is formed with a plurality of cylindrical recesses, each serving as a molding space to manufacture a reaction disc therein. In addition, an annular recess is formed around each recess in order to allow the separation of respective reaction discs. The cylindrical recesses formed in each of the upper and the lower molds has a depth which is usually equal to each other. Accordingly the parting line between the upper and the lower mold is defined at a middle position as viewed in the axial direction of the resulting reaction disc.

When a number of molded reaction discs are taken out by separating the molds after they are filled with a molding material which is then subjected to a vulcanization, the periphery of the individual reaction discs are formed with ring-shaped thick walls, which are produced by the presence of the annular recess, and which are integrally connected together by thin walls formed along the parting line of the both molds. Accordingly, after taking the number of reaction discs which are connected together from the molds, the individual reaction discs are separated from the thick walls to complete each individual reaction disc.

The purpose of providing the ring-shaped thick wall around the outer periphery of the reaction disc is to facilitate the separation of the reaction discs, which are integrally connected together through a thin wall connecting the thick walls of the reaction discs together, from the thin wall while removing any useless thin wall around the outer peripheral surface of each reaction disc between each thick wall and each reaction disc. However, since it is necessary to provide the thin wall for the connection between the ring-shaped thick wall and the outer periphery of the reaction disc in order to facilitate the separation therebetween, it follows that when the reaction discs are separated from the thick wall, there remains a thin walled burr having a minimal height, representing the connection, around the outer peripheral surface of the reaction disc.

The maximum height of the burr coincides with the spacing between the inner peripheral surface of the thick wall and the external peripheral surface of the reaction disc. Since the spacing is minimal, the presence of a burr around the outer periphery of the reaction disc generally does not present a problem.

However, when an axially extending communication groove is formed in the external peripheral surface of the reaction disc to provide an air vent for the purpose mentioned above, any remaining burr in the groove may block the communication groove. If the communication groove which is to serve as an air vent is blocked by such burr, air may be confined between the inner wall surface of the recess of the push rod and the reaction disc to degrade a brake feeling.

The problem may be overcome by providing a deburring operation of the communication groove which is to serve as an air vent, but such operation is cumbersome and expensive.

SUMMARY OF THE INVENTION

In view of the foregoing, in a reaction disc which is formed with a circumferentially extending burr around the outer periphery thereof and which is to be formed with an axially extending air vent in the outer periphery thereof, in accordance with the invention, the air vent which is formed in the outer periphery of the reaction disc is provided as a bulge which projects radially outward of the reaction disc and which is discontinuous in the circumferential direction, with the bulge having a height greater than the height of the burr.

With an arrangement utilizing such bulge, when the reaction disc is inserted into the recess of the push rod, the bulge will be pressed against the inner peripheral surface of the recess. However, since the bulge is discontinuous in the circumferential direction, an axially extending air vent passage may be formed by such discontinuity.

At the same time, the height by which the bulge projects outward is chosen greater than the height of the burr, and therefore the bulge is effective to prevent the burr from being pressed against the inner peripheral surface of the recess. Accordingly, any remaining burr on the reaction disc cannot block the air vent passage.

With the arrangement of providing such communication groove, when the reaction disc is inserted into the recess of the push rod, the choice of the depth of the communication groove so as to be greater than the height of the burr is effective to prevent the air vent passage from being blocked by the burr.

Accordingly, with the arrangement of the invention, a deburring operation subsequent to the molding of the reaction disc can be dispensed with, thus reducing the manufacturing cost.

Above and other objects, features and advantages of the invention will become apparent from the following description of several embodiments thereof with reference to the drawings.

DETAILED DESCRIPTION OF EMBODIMENTS

Figure 1:
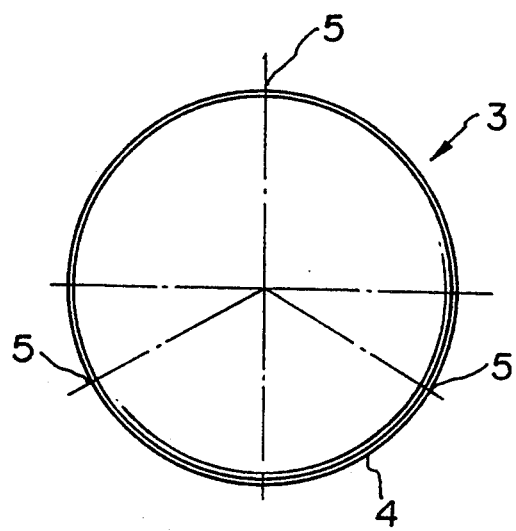
FIG. 1 is a front view of a first embodiment of the invention.
Figure 2:
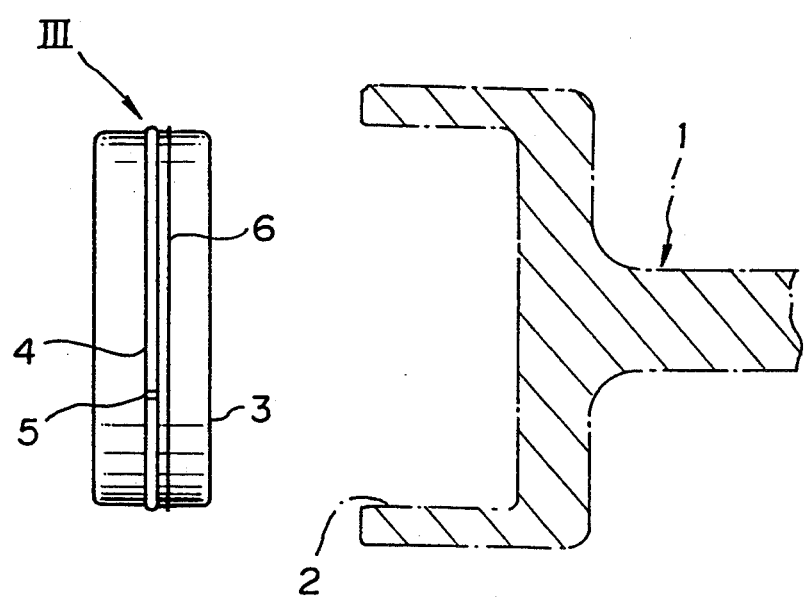
FIG. 2 is a side elevation of FIG. 1.
Figure 3:
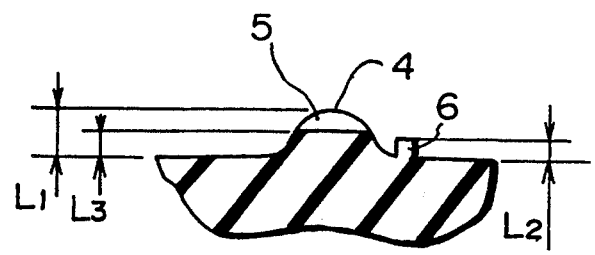
FIG. 3 is a cross section, taken along an arrow III shown in FIG. 2, to an enlarged scale.

Referring to FIGS. 1 to 3 for a description of a first embodiment of the invention, a push rod 1 is formed with a recess 2 at its one end, in which a reaction disc 3 is inserted so that its right end opposes the inner wall surface of the recess 2. The left end face of the reaction disc is disposed in opposing relationship with a valve body and a valve plunger of a brake booster, both not shown. The other end of the push rod 1 slidably extends through a shell of the brake booster to be connected to a piston of a master cylinder.

The external diameter of the reaction disc 3 is chosen to be slightly less than the internal diameter of the recess 2, and the outer peripheral surface of the reaction disc 3 is formed with a ring-shaped bulge 4 which is continuous circumferentially. The bulge 4 has an external diameter which is greater than the internal diameter of the recess 2. The bulge 4 is located at the center, as viewed in the axial length of the outer peripheral surface of the reaction disc 3, and three axially extending communication grooves 5 are formed in the bulge 4 at an equal circumferential interval, thus interrupting the bulge 4 as viewed in the circumferential direction.

A burr 6, which is produced during the manufacture of the reaction disc 3, is formed circumferentially at a position axially displaced from the bulge 4. Thus, the molds which are used to manufacture the reaction disc 3 of the present embodiment have different depths of recesses for the upper and the lower mold.

As shown in FIG. 3 the height $L_1$ by which the bulge 4 projects above the outer peripheral surface of the reaction disc 3 is chosen to be greater than the height $L_2$ of the burr 6, and the height $L_3$ measured at the bottom of the communication groove 5 is chosen to be greater than the height $L_2$ of the burr 6.

By employing the parameters so chosen, when the reaction disc 3 is pressed into the recess 2 of the push rod 1, the reaction disc 3 will be received into the recess 2 while the bulge 4 having a greater diameter than the internal diameter of the recess 2 is deformed by compression radially inward of the reaction disc 3.

When the reaction disc 3 is a press fit into the recess 2 in the manner mentioned above, the bulge 4 is effective to prevent the outer peripheral surface of the burr 6 from being pressed against the internal peripheral surface of the recess 2 since the height $L_1$ of the bulge 4 is chosen greater than the height $L_2$ of the burr 6.

Accordingly, when pressing the reaction disc 3 into the recess 2, the air which is left between the right end face of the reaction disc 3 and the inner wall or end face of the recess 2 can be vented externally through a clearance between the external peripheral surface of the reaction disc 3 and the internal peripheral surface of the recess 2, a clearance between the external peripheral surface of the burr 6 and the internal peripheral surface of the recess 2, and through the communication grooves 5 formed in the bulge 4, avoiding any air which may remain between the right end face of the reaction disc 3 and the inner wall or end face of the recess 2.

Second Embodiment

Figure 4:
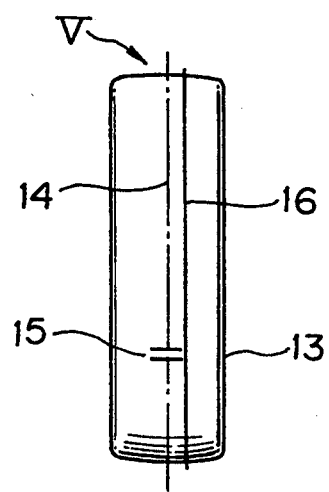
FIG. 4 is a side elevation of a second embodiment of the invention.
Figure 5:
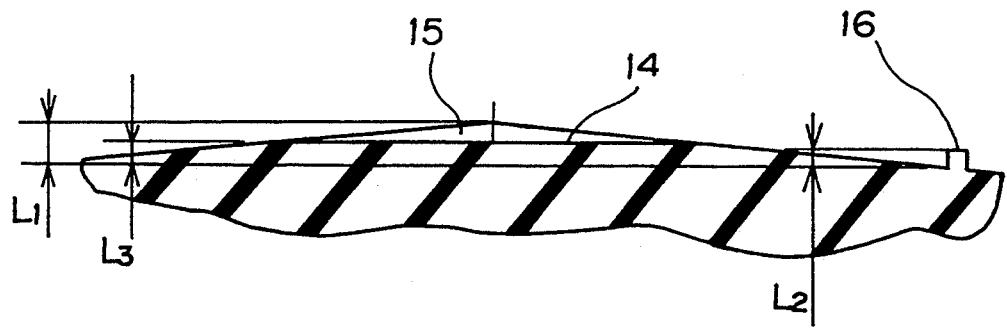
FIG. 5 is a cross section taken in the direction of an arrow V of FIG. 4, to an enlarged scale.

FIGS. 4 and 5 show a second embodiment of invention in which the cross section of a bulge 14 is chevron-shaped, increasing in elevation toward the axial center of the reaction disc 13 from the both axial ends thereof in contradistinction to the semi-circular section of the bulge 4 shown in the first embodiment.

Three communication grooves 15 are formed in the bulge 14 at an equal circumferential interval, and a burr 16 is formed at a location outside the communication groove 15 or axially displaced from the center of the reaction disc 13.

As referenced to the end of the burr 16 at its inner periphery, the bulge 14 has a height $L_1$ which is chosen to be greater than the height $L_2$ of the burr 16, and the bottom surface of the communication groove 15 has a height $L_3$ which is also higher than the height $L_2$ of the burr 16.

In other respects, the arrangement is similar to the first embodiment, and accordingly it will be evident that a similar effect is achieved as in the first embodiment.

Third Embodiment

Figure 6:
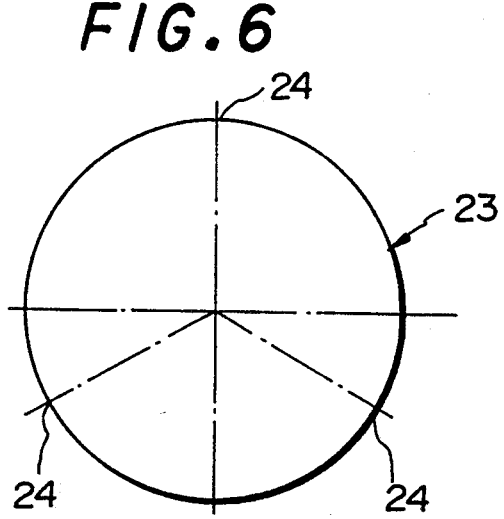
FIG. 6 is a front view of a third embodiment of the invention.
Figure 7:
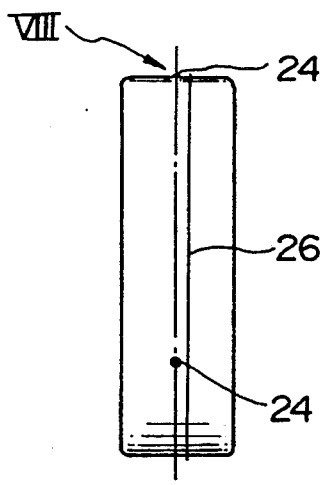
FIG. 7 is a side elevation of FIG. 6.
Figure 8:
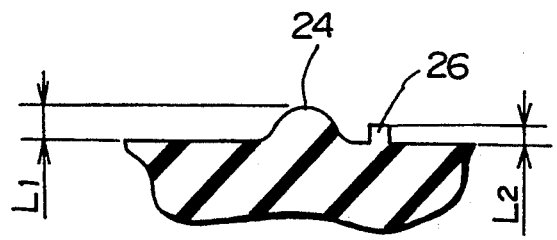
FIG. 8 is a cross section taken along an arrow VIII shown in FIG. 7, to an enlarged scale.

FIGS. 6 to 8 show a third embodiment of the invention. In this instance, three semi-spherical bulges 24 are formed on the external peripheral surface of a reaction disc 23 at its axial center at an equal cicumferential interval. A burr 26 is shown formed as axially displaced from the bulge 24, extending around the outer periphery of the reaction disc 23. The bulge 24 has a height $L_1$ which is chosen greater than the height $L_2$ of the burr 26.

Again, the bulge 24 is effective to prevent the external peripheral surface of the burr 26 from being pressed against the inner wall surface of the recess 2, allowing the air trapped between the end face of the reaction disc 23 and the inner wall or end face of the recess 2 to be vented externally through a clearance between the external peripheral surface of the reaction disc 23 and the internal peripheral surface of the recess 2 and through a clearance between the external peripheral surface of the burr 26 and the internal peripheral surface of the recess 2.

In the first to the third embodiment, the bulge is formed at the axial center of the reaction disc 3 while the burr is formed as displaced from the axial center of the reaction disc. However, it should be understood that a reverse arrangement may be used in which the burr is formed at the axial center of the reaction disc while the bulge is formed as displaced from the axial center of the reaction disc.

Fourth Embodiment

Figure 9:
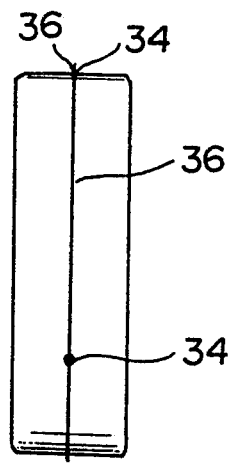
FIG. 9 is a side elevation of a fourth embodiment of the invention.
Figure 10:
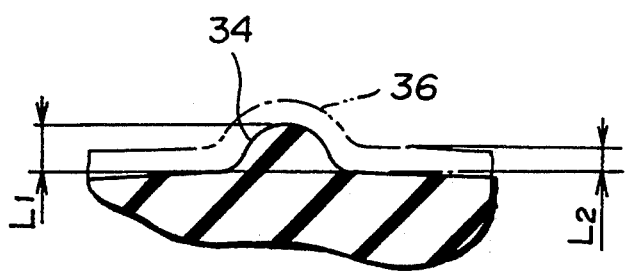
FIG. 10 is an enlarged cross section of part of FIG. 9.

FIGS. 9 and 10 show a fourth embodiment of the invention. In this embodiment, a semi-spherical bulge 34, which is shaped in the same manner as that used in the third embodiment, is formed on the external peripheral surface of a reaction disc 33 at three locations which are circumferentially spaced apart at a given interval and at the axial center of the reaction disc 33. However, the present embodiment differs from the third embodiment in that a burr 36 is also formed at the axial center, and thus is formed in superimposed relationship on top of the bulge 34.

In the present embodiment, the burr 36 has an external diameter which is chosen to be slightly less than the internal diameter of the recess 2 except for a region thereof which is formed on top of the bulge 34. The bulge 34 has a height $L_1$ which is chosen to be greater than the height $L_2$ of the burr 36 while the external diameter of the top of the bulge 34 is chosen to be greater than the internal diameter of the recess 2.

With this embodiment, when the reaction disc 33 is pressed into the recess 2 of the push rod 1, each bulge 34 and the burr 36 which is formed on top of each bulge 34 will be subject to deformation by compression, but the external diameter of the burr 36, except for its region which is formed on top of each bulge 34, is chosen slightly less than the internal diameter of the recess 2, and accordingly there can be secured a clearance between the external peripheral surface of the burr 36 and the internal peripheral surface of the recess 2. In this manner, a positive air vent is provided also in this embodiment.

Fifth Embodiment

Figure 11:
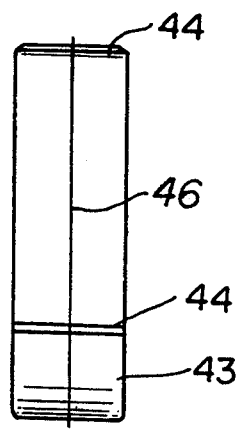
FIG. 11 is a side elevation of a fifth embodiment of the invention.

FIG. 11 shows a fifth embodiment of the invention, which represents a slight modification of the fourth embodiment. In contrast to the semi-spherical configuration of the bulge 34 used in the fourth embodiment, a bulge 44 of this embodiment is a rectilinear projection extending axially from one end to the other end of a reaction disc 43. A burr 46 is formed at the axial center of the reaction disc 43 as in the fourth embodiment, and thus is formed on top of each bulge 44.

In other respects, the arrangement is similar to the fourth embodiment, again providing a positive air venting action.

While the invention has been disclosed above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. A reaction disc for a brake booster in which a burr is formed extending around an external peripheral surface of the reaction disc and an axially extending air vent is formed in the external peripheral surface of the reaction disc;

characterized in that the air vent is provided as a bulge which projects radially outward of the reaction disc and which is discontinuous in the circumferential direction thereof, said bulge having a height which is greater than a height of the burr.

2. A reaction disc according to claim 1 in which the bulge is formed on the external peripheral surface of the reaction disc at its axial center while the burr is formed at a location displaced from the axial center of the external peripheral surface of the reaction disc.

3. A reaction disc according to claim 2 in which the bulge is in a form of an annular projection having a plurality of axially extending communication grooves formed therein at circumferentially spaced locations, a bottom surface of each communication groove having a height, as referenced to the external peripheral surface of the reaction disc, which is greater than the height of the burr.

4. A reaction disc according to claim 3 in which the annular projection is substantially semi-circular in cross section.

5. A reaction disc according to claim 3 in which the annular projection is chevron-shaped increasing its elevation toward the center.

6. A reaction disc according to claim 1 in which the bulge is located at an axial center of the external peripheral surface of the reaction disc and is formed by a plurality of semi-spherical projections which are spaced apart circumferentially, the burr being formed at the axial center of the external peripheral surface of the reaction disc in crossing relationship with the bulge.

7. A reaction disc according to claim 1 in which the bulge comprises a rectilinear projection which extends across the external peripheral surface of the reaction disc from one axial end to the other end thereof while the burr is formed at an axial center of the external peripheral surface of the reaction disc in crossing relationship with the bulge.

* * * * *